United States Patent [19]
Tarpill

[11] Patent Number: 6,131,289
[45] Date of Patent: Oct. 17, 2000

[54] CABLE SLITTER

[75] Inventor: Andrew J. Tarpill, East Haddam, Conn.

[73] Assignee: Capewell Components Company, LLC, Cromwell, Conn.

[21] Appl. No.: 09/275,843

[22] Filed: Mar. 24, 1999

[51] Int. Cl.[7] .................................................. B21F 13/00
[52] U.S. Cl. ........................... 30/90.6; 30/90.1; 30/90.4; 30/90.8; 81/9.4
[58] Field of Search .................................... 30/90.1, 90.4, 30/90.6, 90.8, 91.1, 91.2; 81/9.4

[56] References Cited

U.S. PATENT DOCUMENTS

| | | | |
|---|---|---|---|
| 777,412 | 12/1904 | Hamel et al. | 30/90.6 |
| 2,120,398 | 6/1938 | Edwards et al. | |
| 2,521,688 | 9/1950 | Cataldo et al. | 30/90.1 |
| 2,683,308 | 7/1954 | Cook, Jr. | |
| 3,151,510 | 10/1964 | Bunker et al. | 30/90.6 |
| 3,355,803 | 12/1967 | Hanlon et al. | 30/91.1 |
| 3,750,281 | 8/1973 | Belling | 30/90.8 |
| 3,914,864 | 10/1975 | Price | 30/90.6 |
| 4,615,116 | 10/1986 | Hanson et al. | 30/90.4 |
| 4,741,104 | 5/1988 | Noon | 30/90.4 |
| 4,799,406 | 1/1989 | Diaz-De-Guerenu-Aguirrebeitia | 81/9.4 |
| 4,905,373 | 3/1990 | Krampe | 30/90.6 |
| 4,947,549 | 8/1990 | Genovese et al. | 30/90.8 |
| 4,958,433 | 9/1990 | Persson | 30/91.2 |
| 4,979,299 | 12/1990 | Biegnanski | 30/90.1 |
| 5,093,992 | 3/1992 | Temple, Jr. et al. | 30/90.8 |
| 5,561,903 | 10/1996 | Bourbeau | 30/90.4 |

FOREIGN PATENT DOCUMENTS 3904323   8/1990   Germany ................................. 30/90.1

*Primary Examiner*—Hwei-Siu Payer
*Attorney, Agent, or Firm*—DeLio & Peterson, LLC

[57] ABSTRACT

A cable slitter for separating side-by-side cables connected by a web of insulating material, particularly coaxial cables, includes a slitting blade for separating the cables and a shaving blade for removing excess web material. The shaving blade is mounted on a hinge member between a pair of guide projections. The hinge member is mounted on the tool body and swings to an open position to receive the cable to be separated, allowing the cable to be positioned on a second pair of guide projections on the tool body. The hinge member swings to a closed position to pierce the web material and trap the cable between the guide projections on the hinge member and the guide projections on the body. The guide projections act relative to the "valleys" defined by the web material and the outer circumferences of the cables to guide the tool as the tool is moved lengthwise along the cables. The shaving blade is positioned relative to a surface having a notch therein to remove any excess web material prior to installing connectors on the cables.

18 Claims, 2 Drawing Sheets

CABLE SLITTER

BACKGROUND OF THE INVENTION

1. Field of the Invention

This invention relates to hand tools used to separate cables, such as coaxial video cables, that are held side-by-side by a connecting web of material. More specifically, this invention relates to tools that cut through an attaching web of material to separate adjacent cables and to tools used to strip off any excess web material so that the cable may be attached to a connector.

2. Description of Related Art

Coaxial cables are widely used in many different applications, particularly including the distribution of video signals. In most situations, a single coaxial cable is all that is needed to carry the necessary signals, but there are many other applications where multiple cables are needed, and the cable manufacturing industry has provided various types of multiple cable assemblies to meet these needs.

For long suspended spans, the coaxial cable may be provided with an attached support wire, referred to as the "messenger wire". Messengered cable of this type commonly has the messenger wire positioned adjacent to and parallel with the coaxial cable with both cables being encased in insulating coatings. The two insulated cables are connected together by a web of the same insulating material forming an integral side-by-side coaxial cable and messenger wire support.

In other applications, pairs or triples of coaxial cable may be desired for redundancy or to increase signal carrying capacity. Multiple cable designs may also have twisted pair or multistrand control wires placed adjacent to coaxial cables. Messenger wire supports may be added to these dual and triple cable designs. In each of these designs the cables are held in a side-by-side relationship by a web, usually formed out of the same material used to provide the outer cable insulation layer.

To use such cables, the web must be severed for some distance back from the end of the cable to free the cable for connection to an end point. Often the web is designed to be quite weak, allowing the adjacent cables to be pulled apart. However, this technique can result in damaging the insulating coating on one or more of the cables. Another method of separating the cables is to cut them with a knife, however, this also risks damage to the insulating coating if the knife wanders away from the centerline of the web as the cut is made.

Another difficulty with these techniques is that they leave a ridge of excess web material along the cable. For coaxial cables, in particular, this ridge can interfere with proper attachment of the electrical connector. Coaxial connectors are usually designed for use with coaxial cables having a circular defect-free cross section. The excess web material left with prior slitting techniques produces a protrusion on the cross section which may prevent the cable from properly seating completely in the connector. Alternatively, the ridge may prevent the connector sleeve from properly sealing around the cable when the connector is crimped.

Bearing in mind the problems and deficiencies of the prior art, it is therefore an object of the present invention to provide a cable slitter for separating messengered cables, dual and triple coaxial cables and other types of multiple cables composed of side-by-side cables connected by a web.

It is another object of the present invention to provide a cable slitter that accurately follows and cuts the web between side-by-side adjacent cables without damaging the cables.

A further object of the invention is to provide a cable slitter that remains closed for storage and open for insertion of the cable.

It is yet another object of the present invention to provide a cable slitter that protects the slitting blade when the tool is not in use.

Still another object of the invention is to provide a cable slitter that can trim away any excess web material after the web has been slit.

Still other objects and advantages of the invention will in part be obvious and will in part be apparent from the specification.

SUMMARY OF THE INVENTION

The above and other objects, which will be apparent to those skilled in art, are achieved in the present invention which is directed to a cable slitter having a body, a hinge member and a slitting blade. The body has a body guide projection shaped to guide the body of the slitter to follow along one side of a web connecting first and second cables. The hinge member is hinged to the body for motion between an open position and a closed position and includes a hinge member guide projection shaped to guide the hinge member along an opposite side of the web from the body guide projection. The body guide projection and the hinge member guide projection cooperate to hold a portion of the web between them when the hinge member is closed. The slitting blade is mounted on the slitter and positioned to penetrate the web when the hinge member is moved to the closed position. The slitting blade slits the web and separates the first cable from the second cable as the slitter is guided along the web by the two guide projections.

The preferred design is for one or both of the guide projections to be approximately V-shaped with angularly separated walls connected by blunted ends. The blunted ends of the guide projections contact the web on opposite sides when the hinge member is in the closed position and the walls contact the first and second cables to guide the cable slitter between them along the web.

In a more highly preferred design, the body guide projection, the hinge member guide projection, or both projections are actually constructed as a pair of projections located on opposite sides of the slitting blade when the hinge member is in the closed position. This construction has the pair of guide projections acting to guide the blade in a leading/trailing relationship.

In one embodiment of the invention, the slitting blade is mounted on the hinge member and the hinge member guide projection is designed with the pair of projections on opposite sides of the slitting blade. In this design, closing the hinge member causes the slitting blade to pierce the web.

In the most highly preferred design both the body guide projection and the hinge member guide projections are constructed of pairs of projections which act to guide the web and hold the web aligned with the slitting blade as the web is cut. In this embodiment, the cable slitter includes a spring acting between the body and the hinge member for urging the hinge member towards the closed position. This makes it easy to manipulate the tool with a single hand. The cable slitter may also be provided with a catch to hold the hinge member in the open position allowing a cable to be positioned in the tool and/or in the closed position to protect the blade during storage. The type of catch that is preferred is a spring-loaded ball and detent catch.

Another aspect of the invention is the inclusion of a shaving blade mounted on the body for shaving excess web from the first or second cable after the first cable has been separated from the second cable. In this embodiment, the body includes a shaving surface that is substantially aligned with the shaving blade. The shaving surface has a notch formed therein for receiving the excess web to be shaved. The notch guides the excess web into the shaving blade, and the shaving surface contacts the outer perimeter of the cable at either side of the excess web and holds the cable at the correct height so that the shaving blade may trim the excess web material correctly. In the preferred design incorporating a shaving blade, the shaving blade is substantially flat.

In one design of the slitting blade, the blade has a first cutting surface oriented to slit the web when the cable slitter is moved in a forward direction along the web, and a second cutting surface oriented to slit the web when the cable slitter is moved in a reverse direction along the web. In this design, the first and second cutting surfaces of the slitting blade are oriented at approximately 45 degrees to the web when the hinge member is in the closed position.

Although the invention may be implemented with various designs, in the preferred design shown, the body includes a body wall and a base surface extending outward from the body wall. The body guide projection is mounted on the base surface and projects generally upwards therefrom. The hinge member extends outward from the body wall. The hinge member guide projection projects generally downwards towards the base surface when the hinge member is in the closed position and the body wall, base surface, hinge member and guide projections define an opening when the hinge member is in the closed position. As the cable is slit, one of the first and second cables passes through the opening and the other cable passes outside the opening.

BRIEF DESCRIPTION OF THE DRAWINGS

The features of the invention believed to be novel and the elements characteristic of the invention are set forth with particularity in the appended claims. The figures are for illustration purposes only and are not drawn to scale. the invention itself, however, both as to organization and method of operation, may best be understood by reference to the detailed description which follows taken in conjunction with the accompanying drawings in which:

DESCRIPTION OF THE PREFERRED EMBODIMENT(S)

In describing the preferred embodiment of the present invention, reference will be made herein to FIGS. 1–5 of the drawings in which like numerals refer to like features of the invention.

Figure 1:
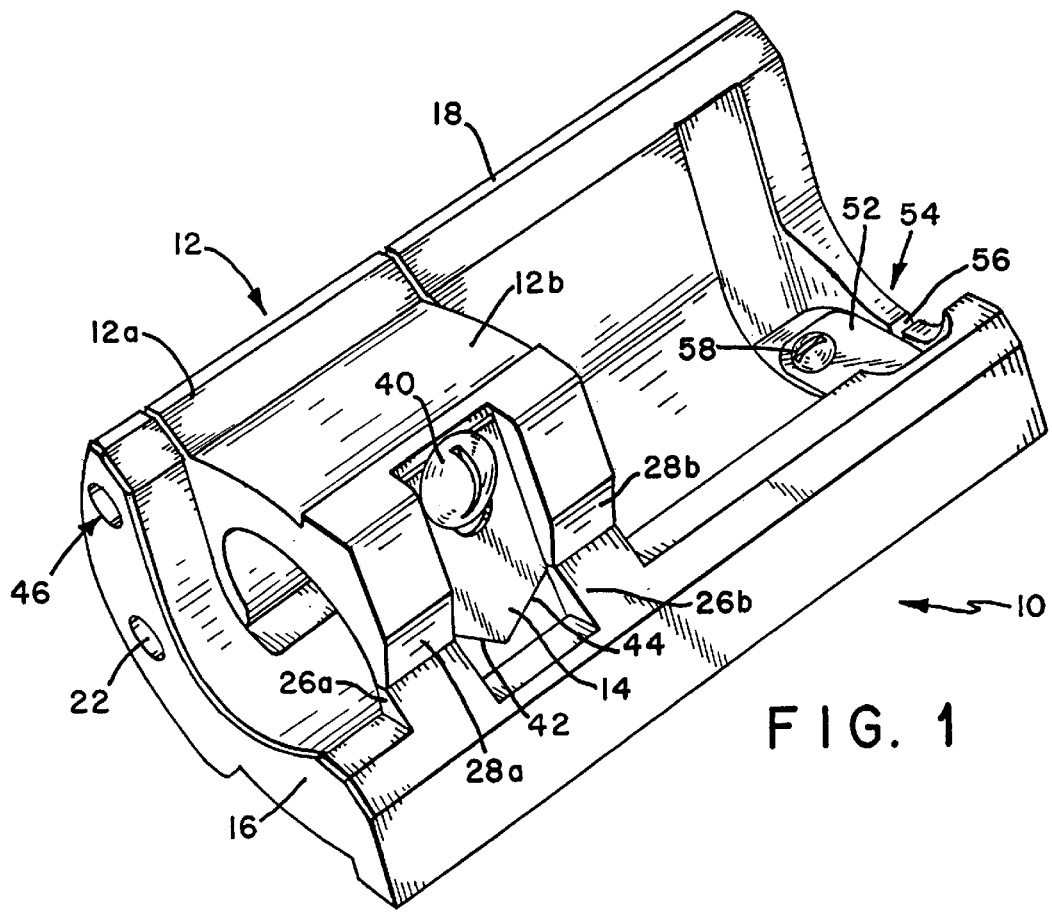
FIG. 1 is a perspective view of a preferred embodiment of the cable slitting tool of the present invention, seen from the left front quadrant.

FIG. 1 provides a perspective view of the preferred embodiment of the present invention which includes a body 10, a hinge member 12 and a slitting blade 14.

Figure 2:
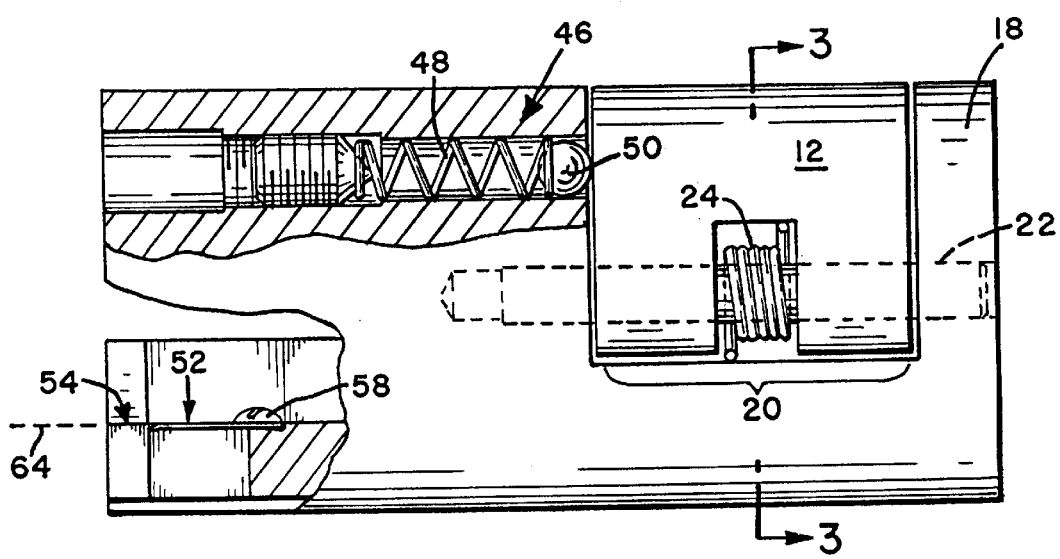
FIG. 2 is a back elevational view of the cable slitting tool of the present invention, with portions being cut away and shown in cross section.

The body includes a base surface 16 extending generally outwards and a body wall 18 extending generally upwards. Referring also to FIG. 2, which provides a back view of the tool, the body wall 18 has a notch 20 formed therein which receives the hinge member 12. The hinge member includes a wall portion 12a which approximately matches the cross sectional shape of the body wall 18, and an arm portion 12b which extends outwards in a direction approximately parallel to the base surface 16 when the hinge member is in the closed position as illustrated.

The hinge member 12 is pivoted on pivot pin 22 which extends across notch 20 allowing the hinge member to be moved between an open position in which the cable may be positioned under the slitting blade 14 and the closed position shown. Torsion spring 24 is positioned around hinge pin 22 and acts to keep the hinge member 12 in the closed position.

Figure 3:
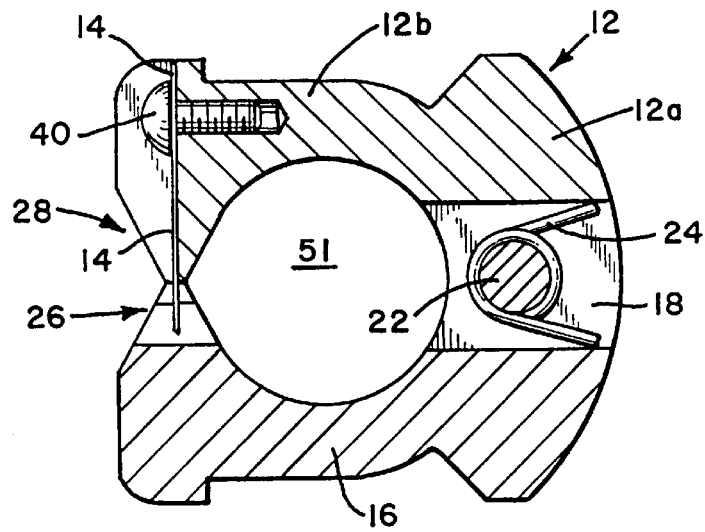
FIG. 3 is a cross sectional view of the cable slitting tool of the present invention, taken along the line 3—3 in FIG. 2.
Figure 4:
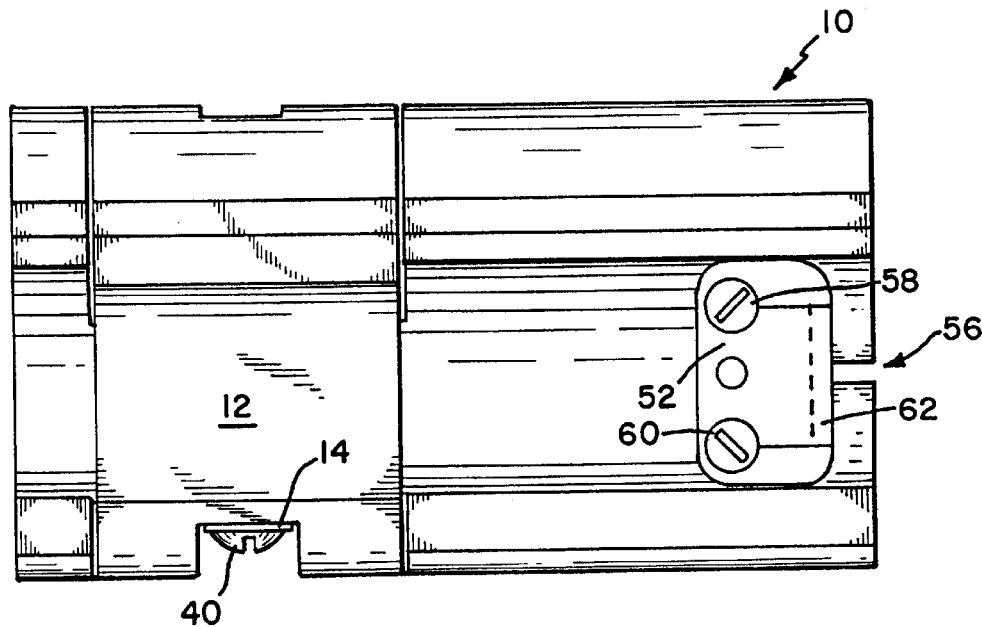
FIG. 4 is a top plan view of the cable slitting tool of the present invention.

Referring to FIGS. 1 and 3, the base surface 16 includes a guide projection 26 extending generally upwards. As may be seen in FIG. 3, the guide projection 26 is approximately V-shaped and includes angularly separated walls connected with a somewhat blunted or rounded end. As may be seen in FIG. 1, in the preferred embodiment, the body guide projection 26 includes a pair of V-shaped projections 26a and 26b, each with the same cross sectional shape.

As my be seen best in FIG. 3, the hinge member 12 also includes a guide projection 28 extending generally downwards from the hinge member arm 12b which also has a generally V-shaped appearance composed of a pair of side walls connected by a blunted end. With the hinge member 12 in the closed position as illustrated in FIG. 3, the hinge member guide projection 28 comes into alignment with the body guide projection 26. As may been seen in FIG. 1, in the preferred embodiment, the hinge member guide projection 28 also includes a pair of guide projections 28a, and 28b such that the blunted ends of the guide projections 28a and 28b come into alignment with the blunted ends of the guide projections 26a and 26b.

Figure 5:
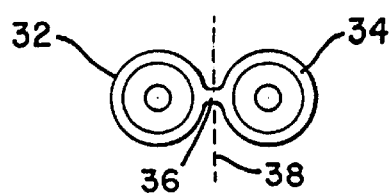
FIG. 5 is a cross sectional view of a dual coaxial cable of a type that may be slit by the cable slitting tool of the present invention.

The present invention is designed to slit cables of many different types, including messengered cables, dual or "siamese" cables, as well as triple cables and various other side-by-side combinations of control cables, coaxial cables and support cables. FIG. 5 provides a cross section of a typical dual coaxial cable used for coaxial video transmission applications. This cable is composed of a first cable 32 and a second cable 34 connected by a web 36. The web 36 is made up of the same material used to provide the outer insulating coating for the first and second cables 32, 34. In order to install these coaxial cables 32, 34, the web must be cut along plane 38 and this requires that the cable be accurately guided relative to the blade as the cut is made.

The present tool accomplishes this task through the use of the guide projections 26, 28. The slitting blade 14 is mounted to the hinge member 12 between guide projections 28a and 28b such that it projects between the pair of guide projections 26a and 26b on the base when the hinge member swings closed.

The cable is placed between the guide projections which follow along the upper and lower "valleys" between the first and second cables 32, 34. These valleys are formed by the web 36 and the outer circumference of the cables 32, 34 in the vicinity of the web. The guide projections 26, 28 are shaped with blunted end V-shapes so as to approximately correspond to the shape of these valleys in the cable. The guide projections trap the web between them and steer the cable into the slitting blade by following the "valleys" on each side of the cable.

The shape of the hinge member 12 and the body 10 are not critical. The body and hinge member must extend on opposite sides of the cable to hold the guide projections, and the slitting blade 14 must be brought into position to cut the web. Various alternative shapes for the body and hinge member will meet these requirements. The shape of the guide projections is selected so that the cable can be held and guided relative to the slitting blade. Thus the blunted ends and V-shape of the guide projections may be modified as desired to match different cables. The illustrated V-shape will provide good results for many different cables.

To use the tool, the hinge member 12 is raised and the cable pair composed of first and second cables 32, 34 is positioned on the body guide projections 26a, 26b such that the slitting blade 14 lies in plane 38. The hinge member 12 is then moved to the closed position causing the slitting blade 14 to pierce the web 36. The tool is then moved axially along the cable to slit the web 36 and separate the first cable 32 from the second cable 34.

As may be seen in FIG. 1, the slitting blade 14 is mounted on the hinge member 12, at the end of the arm 12b, with screw 40. The screw may be removed to replace the blade. The slitting blade includes two cutting surfaces 42, 44 which are approximately perpendicular to each other and which are positioned at about 45° to the axis of the cable. These surfaces allow the slitting tool to be moved in either direction to cut the web 36. The 45° angle helps to hold the cable against the body guide projections 26a and 26b as the tool is moved longitudinally along the cable making the slit. Although 45° is preferred, other angles may be used, or the blade may be vertical.

The slitting blade 14 is mounted on the hinge member 12 in the preferred design. However, this arrangement is not required, and, if desired, the blade may be mounted on the body portion and reversed to extend upwards.

Referring to the cut away portion at the upper left of FIG. 2, it may be seen that the tool is provided with a catch 46 in the form of a spring loaded ball detent. Catch 46 is composed of a spring 48 and a ball 50. The ball 50 engages the hinge member 1 2, preferably in a detent or at an edge of the hinge member, to hold it in the open position against the closing force of torsion spring 24. This allows a cable to be easily positioned in the tool prior to slitting it. The catch 46 may also be used to ensure that the tool remains closed by providing a second detent in the hinge member that is engaged by the ball when the tool is closed. This prevents the tool from inadvertently being opened and exposing the slitting blade 14.

As may be seen best in FIG. 3, the body 10 and hinge member 12 define an opening 51 between the guide projections and body wall. When the tool is in use one portion of the cable will pass inside the opening while the other portion of the cable will pass outside the opening. The web will pass directly along the plane of the blade 14 which coincides with plane 38 in FIG. 5 between the adjacent cables. As the tool is moved along the cable, the web is cut and the cables are separated.

After the cables are separated, each cable portion will include a small ridge of excess web material. This excess web material will often make it impossible to get a connector to make a proper seal with the cable. Accordingly, the present invention is provided with a shaving blade 52 (see FIGS. 1 and 4) mounted to the body 10 for removing this excess web material from the cables after they are separated.

The shaving blade 52 is mounted to the body in alignment with a shaving surface 54 having a notch 56 located therein. The shaving blade 52 is attached to the body 10 by screws 58, 60 such that the edge 62 of the shaving blade is exactly aligned with the upper surface of the shaving surface 54. The shaving blade 52 defines a plane which coincides with the plane defined by the surface 54. The notch 56 allows the cable to sit on surface 54 with the outer circumference of the cable approximately tangent to the plane of surface 54 (and the blade) and with the excess web material positioned below that plane.

To use the shaving blade, the excess web material is aligned with the notch such that the excess web material projects down into the notch below the plane 64 of the blade 52. The cable is then pushed into the shaving blade which shaves the excess web material off of the cable producing a cut that is flush with the outer circumference of the cable.

As the excess web material is shaved off it passes below the blade 52 while the cable passes above the blade. The shaving surface 54 rides in contact with the perimeter of the cable on either side of the excess web material accurately holding the cable at the proper elevation for the excess web material to be shaved off. The notch acts to guide the cable and maintain this alignment as the cut is made. The shaving blade 52 is preferably flat, although a curved blade may also be used.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A cable slitter comprising:

a body having at least one body guide projection, the at least one projection having an approximately V-shaped cross section and acting to guide the body of the slitter between first and second cables and along one side of a web connecting the first cable to the second cable;

a hinge member, hingedly attached to the body for motion between an open position and a closed position, the hinge member including at least one hinge member guide projection shaped to guide the hinge member along an opposite side of the web from the body guide projection, the body guide projection and the hinge member guide projection holding a portion of the web therebetween when the hinge member is moved to the closed position; and the body and the hinge member defining an opening therebetween when the hinge member is in the closed position; and a slitting blade mounted on the slitter and positioned to close the opening, and penetrate the web when the hinge member is moved to the closed position, the slitting blade slitting the web and separate the first cable from the second cable as the slitter is guided along the web by the body guide projection and the hinge member guide projection, one of the first and second cables passing through the opening as the cables are separated.

2. A cable slitter comprising:

a body having a body guide projection shaped to guide the body of the slitter to follow along one side of a web connecting first and second cables;

a hinge member, hingedly attached to the body for motion between an open position and a closed position, the hinge member including a hinge member guide projection shaped to guide the hinge member along an opposite side of the web from the body guide projection, the body guide projection and the hinge member guide projection holding a portion of the web therebetween when the hinge member is moved to the closed position; and a slitting blade mounted on the slitter and positioned to penetrate the web when the hinge member is moved to the closed position and to slit the web and separate the first cable from the second cable as the slitter is guided along the web by the body guide projection and the hinge member guide projection.

3. The cable slitter of claim 2 wherein the body guide projection is approximately V-shaped.

4. The cable slitter of claim 3 wherein the body guide projection and the hinge member guide projection are approximately V-shaped and include angularly separated walls connected with blunted ends, the blunted ends of the guide projections contacting the web on opposite sides when the hinge member is in the closed position and the walls contacting the first and second cables to guide the cable slitter between the first and second cables along the web.

5. The cable slitter of claim 2 wherein the body guide projection comprises a pair of projections located on opposite sides of the slitting blade when the hinge member is in the closed position.

6. The cable slitter of claim 2 wherein the slitting blade is mounted on the hinge member and the hinge member guide projection comprises a pair of projections located on opposite sides of the slitting blade.

7. The cable slitter of claim 5 wherein the body guide projection comprises a pair of projections and the slitting blade extends between the pair of projections on the body and between the pair of projections on the hinge member, the pairs of projections on the body and on the hinge member acting to guide the web and hold the web aligned with the slitting blade as the web is cut.

8. The cable slitter of claim 2 further including a spring acting between the body and the hinge member for urging the hinge member towards the closed position.

9. The cable slitter of claim 8 further including a catch for holding the hinge member in the open position.

10. The cable slitter of claim 9 wherein the catch comprises a spring-loaded ball and detent catch.

11. The cable slitter of claim 2 further including a shaving blade mounted to the body for shaving excess web from the first or second cable after the first cable has been separated from the second cable.

12. The cable slitter of claim 11 wherein the body further includes a shaving surface substantially aligned with the shaving blade, the shaving surface having a notch formed therein for receiving the excess web to be shaved.

13. The cable slitter of claim 11 wherein the shaving blade is substantially flat.

14. The cable slitter of claim 2 wherein the slitting blade has a first cutting surface oriented to slit the web when the cable slitter is moved in a forward direction along the web, and a second cutting surface oriented to slit the web when the cable slitter is moved in a reverse direction along the web.

15. The cable slitter of claim 14 wherein the first cutting surface of the slitting blade is approximately perpendicular to the second cutting surface of the slitting blade.

16. The cable slitter of claim 14 wherein the first and second cutting surfaces of the slitting blade are oriented at approximately 45 degrees to the web when the hinge member is in the closed position.

17. The cable slitter of claim 2 wherein:

the body includes a body wall having a notch formed therein;

the cable slitter further includes a hinge pin extending across the notch in the body wall; and the hinge member is hingedly mounted on the hinge pin in the notch in the body wall.

18. The cable slitter of claim 16 wherein:

the body includes a base surface extending outward from the body wall;

the body guide projection is mounted on the base surface and projects generally upwards therefrom;

the hinge member extends outward from the body wall;

the hinge member guide projection projects generally downwards towards the base surface when the hinge member is in the closed position; and the body wall, the base surface, the hinge member and the guide projections define an opening when the hinge member is in the closed position, one of the first and second cables passing through the opening and the other of the cables passing outside the opening as the web is slit.

* * * * *

UNITED STATES PATENT AND TRADEMARK OFFICE
Certificate

Patent No. 6,131,289

Patented: October 17, 2000

On petition requesting issuance of a certificate for correction of inventorship pursuant to 35 U.S.C. 256, it has been found that the above identified patent, through error and without deceptive intent, improperly sets forth the inventorship.

Accordingly, it is hereby certified that the correct inventorship of this patent is: Andrew J. Tarpill, East Haddam, Connecticut; and Tadeusz Zagula, Hartford, Connecticut.

Signed and Sealed this Sixth Day of November 2001.

RINALDI RADA
*Supervisory Patent Examiner*
Art Unit 3724